(12) United States Patent
Rasmus et al.

(10) Patent No.: US 6,408,059 B1
(45) Date of Patent: *Jun. 18, 2002

(54) DATA PROCESSING SYSTEM HAVING A PROGRAMMABLE MODEM AND METHOD THEREFOR

(75) Inventors: Todd Morgan Rasmus; Douglas Edward Smith, both of Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,743

(22) Filed: Nov. 8, 1999

Related U.S. Application Data

(63) Continuation of application No. 08/951,722, filed on Oct. 16, 1997.

(51) Int. Cl.[7] .............................................. H04M 11/00
(52) U.S. Cl. ............................. 379/93.29; 379/93.05; 375/222
(58) Field of Search ...................... 379/90.01, 93.01, 379/93.05, 93.06, 93.09, 93.26–93.32, 93.34, 398–399, 393–394, 443, 413, 92.01, 93.07; 375/222, 241–242, 340

(56) References Cited

U.S. PATENT DOCUMENTS

| 4,425,665 | A | | 1/1984 | Stauffer | 375/9 |
|---|---|---|---|---|---|
| 4,841,561 | A | | 6/1989 | Hill | 379/97 |
| 4,868,863 | A | | 9/1989 | Hartley et al. | 379/98 |
| 5,134,648 | A | | 7/1992 | Hochfield et al. | 379/98 |
| 5,239,580 | A | | 8/1993 | Bruno et al. | 379/443 |
| 5,367,563 | A | | 11/1994 | Sainton | 379/98 |
| 5,430,793 | A | | 7/1995 | Ueltzen et al. | 379/98 |
| 5,497,373 | A | | 3/1996 | Hulen et al. | 370/79 |
| 5,500,894 | A | | 3/1996 | Hershbarger | 379/399 |
| 5,532,898 | A | | 7/1996 | Price | 361/119 |
| 5,649,001 | A | * | 7/1997 | Thomas et al. | 379/93.07 |
| 5,712,977 | A | * | 1/1998 | Glad et al. | 379/93.29 |
| 5,790,656 | A | * | 8/1998 | Rahamin et al. | 379/399 |
| 5,999,619 | A | * | 12/1999 | Bingel | 379/398 |
| 6,091,806 | A | * | 7/2000 | Rasmus et al. | 379/93.29 |

* cited by examiner

*Primary Examiner*—Sinh Tran
*Assistant Examiner*—George Eng
(74) *Attorney, Agent, or Firm*—Joscelyn G. Cockburn (57) ABSTRACT

A programmable modem or PSTN interface whose electrical characteristics can be programmed by software to satisfy multiple international telecommunication standards is implemented. Specifically, this modem configures a data access arrangement (DAA) circuit to provide a telephone connection having characteristics suitable for each unique country standard, without requiring the DAA to be replaced or to have any hardware modifications. Furthermore, the required changes to the DAA may be made "on the fly" during homologation testing.

10 Claims, 9 Drawing Sheets

ADJUSTABLE DC HOLDING CIRCUIT

DATA PROCESSING SYSTEM HAVING A PROGRAMMABLE MODEM AND METHOD THEREFOR

This application is a continuation of 08/951,722 filed Oct. 16, 1997.

TECHNICAL FIELD

The present invention relates in general to a modem in a data processing system, and, more particularly, to a programmable modem in a data processing system.

BACKGROUND INFORMATION

When data processing equipment is connected to a telephone system or other analog system, use is made of a modem. The purpose of the modem (modulator/demodulator) is to convert the digital data stream within the data processing equipment into a form which is suitable for transmission over a telephone network, and conversely, to convert analog signals from the telephone system to a form which is suitable for transmission to the data processing equipment. A typical modern modem is disclosed in U.S. Pat. No. 4,431,867.

With the advent of certain advances in modem technology, high speed data transmission has been made possible between computers over a public switched telephone network (PSTN). Furthermore, additional advantages have occurred in the area of portable computing systems. Some of these advantages include small PC card (formerly referred to as PCMCIA) modems that have been developed to offer both high speed data transmission and portability to a mobile user. With such mobile use, it is inevitable that modems will be used in any international country. However, modems intended to be used during international travel must meet all applicable performance, electromagnetic compatibility (EMC), and safety criteria mandated by government controlled regulatory agencies for that country.

A problem arises because there is no single standard telephone line and each telephone network in each country has its own criteria. Each country also has an individual approval procedure, as well as regulations which make it illegal to connect unapproved equipment to the telephone network of that country. Thus, there are two problems which need to be overcome when equipment is connected to a telephone line. First, the equipment must be able to respond to the signals which it received over a particular network and to issue signals which are compatible with that network. Second, the equipment must be approved in a "homologation" process by an appropriate governmental body so that it can be legally connected to the public telephone network. Within this specification, the approval body will be referred to as the PTT (from Postal Telephone and Telegraph) authority. Equipment will not normally be approved by the PTT if it is capable of issuing incorrect signals. Furthermore, the equipment should be tamper proof and, therefore, it should not be possible for some unauthorized person to modify the equipment so that it no longer conforms to the particular network standards.

These problems have resulted in modems which are manufactured in various versions, where each version corresponds to a particular country. For example, a modem requires interface circuitry to provide electrical isolation between the modem's microprocessor-based control circuitry and the higher voltage PSTN network. Such modem interface circuitry is referred to as the Data Access Arrangement (DAA). Normally, the DAA is designed to be country-specific and is intended to be fully compatible with the telecommunications standards mandated by each individual country. In the United States, FCC Standard Part Number 68 governs criteria primarily intended to protect the United States PSTN from damage while connecting to telecommunication terminal equipment (TTE). European agency approval requires that additional telecommunications standards be met. These standards differ significantly from those standards set forth in the United States. Furthermore, some individual European countries have mutually exclusive specifications which often conflict with the standards for other countries. As a consequence, the DAA structure is usually designed to be country-specific. For this reason, modems intended for the world-wide market usually incorporate "pluggable" DAA assemblies which are country-specific, or incorporate a base card design which can be populated with country-specific componentry during manufacturing.

The use of pluggable DAA assemblies-and devices which may be modified using country-specific components is expensive and, therefore, is often not economical to implement. Therefore, a need exists for a modem which allows a user to configure a modem to yield telecommunication characteristics suitable for each unique country standard in a manner which is efficient to implement and utilize.

SUMMARY OF THE INVENTION

The previously mentioned needs are fulfilled with the present invention. Accordingly, there is provided, in a first form, a data access arrangement circuit. The data access arrangement circuit includes an input circuit for receiving a plurality of data and control signals. The data access arrangement circuit also includes a ring-detect circuit connected to the input circuit for receiving a first portion of the plurality and control signals. The ring-detect circuit is programmably configured to have one of a plurality of electrical interface characteristics.

Additionally, there is provided, in a second form, a data processing system. The data processing system includes a central processor for communicating a plurality of data signals. The data processing system also includes an interface circuit connected to the central processor for communicating a plurality of data signals. The interface circuit is programmably configured to have one of a plurality of electrical interface characteristics in response to the plurality of data signals.

Furthermore, there is provided, in a third form, a method for operating a data processing system. The method includes the steps of communicating a plurality of data signals from a central processor to an interface circuit and programmably configuring the interface circuit to have one of a plurality of electrical interface characteristics in response to the plurality of data signals.

Additionally, there is provided, in a fourth form, a programmed storage device readable by a machine tangibly embodying a program of instructions executable by the machine to perform method steps for configuring an interface circuit. The method steps include communicating a plurality of data signals from a central processing unit to the interface circuit and programmably configuring the interface circuit to have one of a plurality of electrical interface characteristics in response to the plurality of data signals.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a programmable modem or PSTN interface whose electrical characteristics can be programmed by software to satisfy multiple international telecommunication standards. Specifically, the modem of the present invention configures a data access arrangement (DAA) to provide a telephone connection having characteristics suitable for each unique country standard, without requiring the DAA to be replaced or to have any hardware modifications. Furthermore, the required changes to the DAA may be made "on the fly" during homologation testing.

During homologation testing, several electrical characteristics which are controlled by the DAA are examined. Such characteristics include an AC (alternating current) termination impedance, a Ring signal impedance, a ring detection threshold, and an off-hook terminal resistance. Additionally, some countries implement testing for other characteristics, including pulse-meter filtering and a dial loop examination. The present invention provides an apparatus and methodology for programmably implementing and modifying each of these characteristics in the modem, without hardware changes, in an efficient and easy-to-use manner.

The present invention generally functions as follows. Once at an international destination, the user configures the modem to be compatible with that location's telecommunications standards by selecting a desired country from a graphical user interface. The appropriate country specific parameters are retrieved from a country table stored in a memory within the modem. These parameters are then transferred to a microcontroller and a data pump of the modem. The microcontroller subsequently configures a programmable DAA subcircuits through a serial bus interface. For example, the off-hook terminal characteristic is programmed into the DC holding circuit of the modem, while the ring voltage threshold and ring impedance are programmed into a ring detection circuit of the modem. Each of these characteristics and their implementations will subsequently be described in greater detail. However, prior to describing these characteristics, a description of connectivity of each component of the present invention will be provided.

Description of Connectivity

In the following description, numerous specific details are set forth to in provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
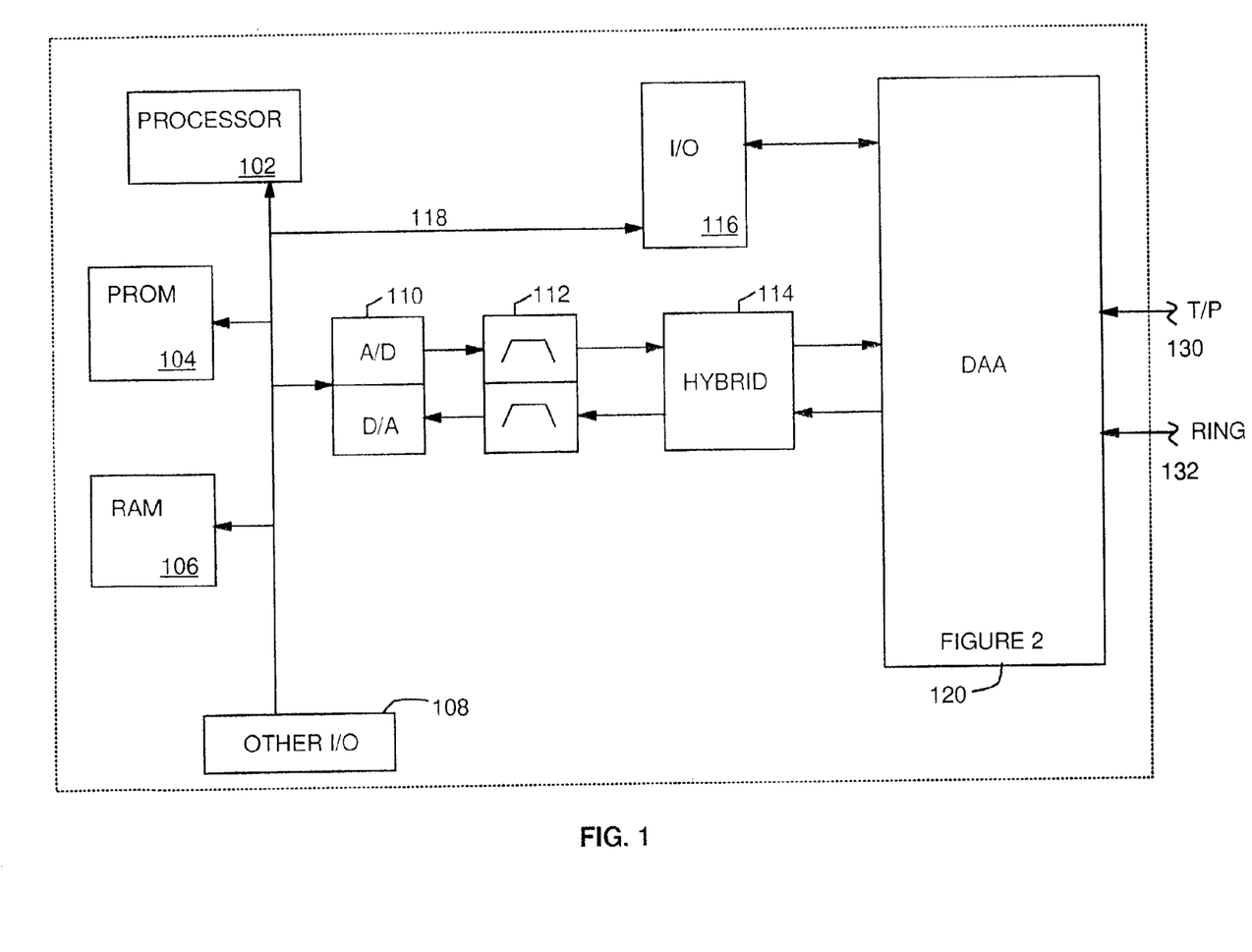
FIG. 1 illustrates, in block diagram form, a telecommunication system in accordance with one embodiment to the present invention.

FIG. 1 illustrates, in block diagram form, one embodiment of a processing system which implements the present invention. Data processing system 100 comprises a processor 102, a programmable read-only memory (PROM) 104, a random access memory (RAM) 106, and other input/output (I/O) circuit 108, a converter 110, a lead 112, a hybrid circuit 114, and input/output (I/O) circuit 116, and a data access arrangement (DAA) circuit 120.

A Tip signal 130 and a Ring signal 132 are provided to DAA 120. DAA 120 is bidirectionally coupled to I/O circuit 116 and to hybrid circuit 114. Processor 102 is coupled to I/O circuit 116, PROM 104, RAM 106, other I/O circuit 108, and converter 110. Converter 110 is coupled to lead 112. Lead 112 is coupled to hybrid circuit 114.

Figure 2:
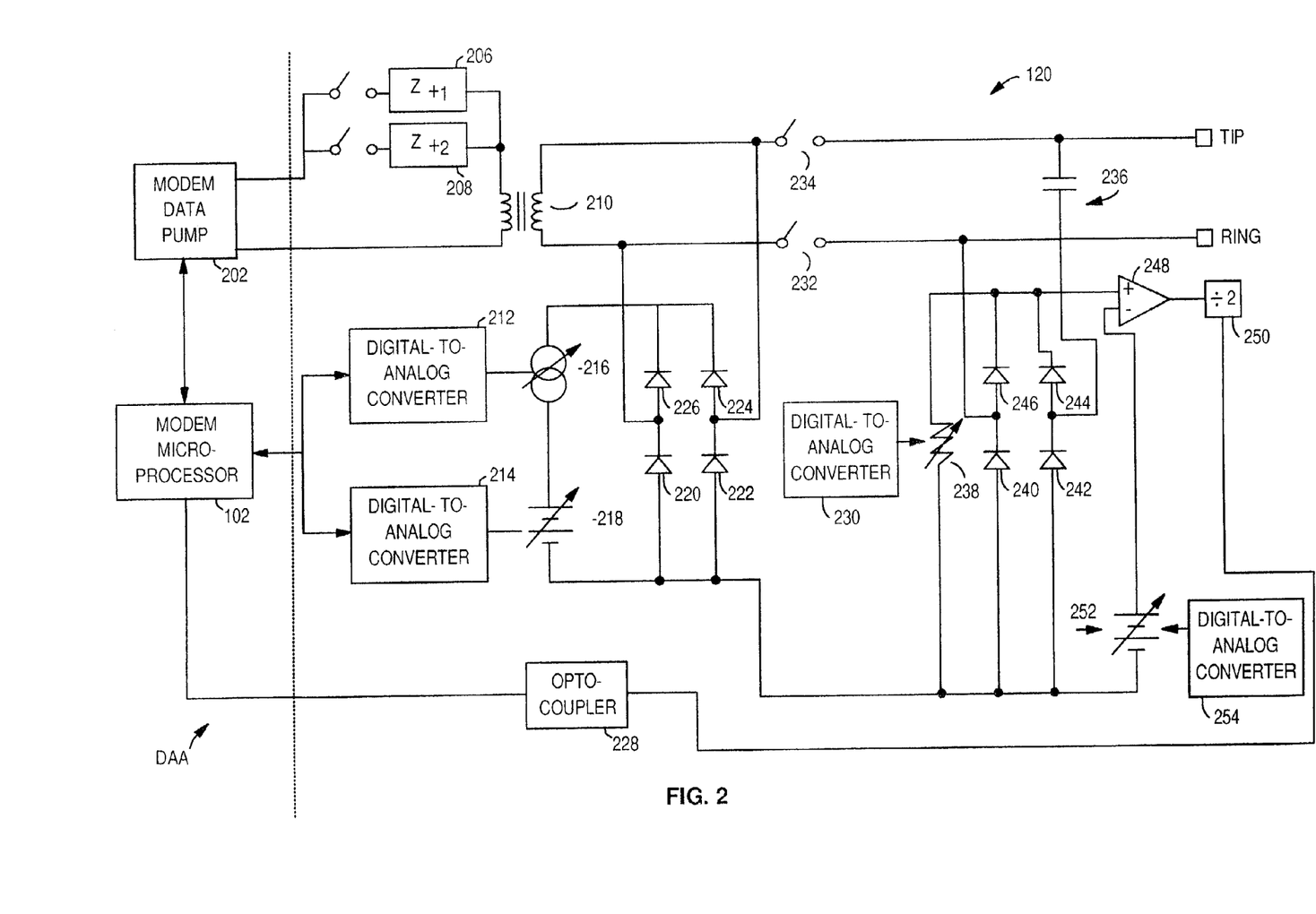
FIG. 2 illustrates, in block diagram form, a portion of a data access arrangement (DAA) of FIG. 1.

FIG. 2 illustrates one embodiment of DAA 120 in greater detail. DAA 120 comprises an analog switch 206, an analog switch 208, a transformer 210, a digital-to-analog converter 212, a digital analog converter 214, a variable current source 216, a variable voltage source 218, a diode 220, a diode 222, a diode 224, a diode 226, an opto-coupler 228, a digital-to-analog converter 230, a switch 232, a switch 234, a capacitor 236, a variable resistor 238, a diode 240, a diode 242, a diode 244, a diode 246, an operational amplifier 248, a divide circuit 250, a variable voltage source 252, and a digital-to-analog converter 254.

Although not included within DAA 120, modem data pump 202 and modem microprocessor 102 are illustrated within FIG. 2 to provide a complete configuration. It should be noted that modem microprocessor 102 corresponds to processor 102 of FIG. 1 and modem data pump 202 corresponds to devices 110 and 112 of FIG. 1. Additionally, it should be noted that modem data pump 202 may utilize a digital signal processor (DSP) to perform some functions. Although the DSP is not illustrated in detail in FIGS. 1 or 2, such a DSP may be implemented in one embodiment of the present invention. Digital-to-analog converter 254 is implemented to account for a range of potential amplitudes of a ring signal. For example, in the United States, the ring signal ranges from 40 volts. to 150 volts. Therefore, a ring-detect circuit should be capable of sensing a voltage value when its amplitude is at or above a certain threshold level. However, the ring-detect circuit must be able to differentiate between smaller amplitude voltage signals which the phone company utilizes to perform test operations. Therefore, digital-to-analog converter 254 provides a voltage reference to converter 248 in response to a voltage threshold for the ring-detect circuit.

During operation, modem data pump 202 is bidirectionally coupled to modem microprocessor 102. Modem data pump 202 is selectively coupled to an input of analog switch 206 and an input of analog switch 208. An output of each of analog switches 206 and 208 is coupled to a first side of transformer 210.

Additionally, modem data pump 202 is coupled to the first side of transformer 210. A second side of transformer 210 is coupled to switch 234 to selectively receive the Tip signal. An input of switch 234 is also coupled to an output of diode 222 and an input of diode 224. Similarly, a second side of transformer 210 is coupled to switch 232 to selectively receive a Ring signal. Input switch 232 is also coupled to an output of diode 220 and an input of diode 226. Modem microprocessor 102 is bidirectionally coupled to each digital-to-analog converter 212 and digital-to-analog converter 214. Digital-to-analog converter 212 is coupled to variable current source 216. An output of digital-to-analog converter 214 is coupled to variable voltage source 218. An output of variable voltage source 218 is coupled to an input of variable current source 216. An output of variable source 216 is coupled to an output of each of diodes 224 and 226. An input to variable voltage source 218 is coupled to an input of each of diodes 220 and 222. Additionally, an input of variable voltage source 218 is coupled to an input of variable voltage source 252, an input to diode 242, an input to diode 240, and an input to variable resistor 238. An output of diode 220 is coupled to an input of diode 226. Similarly, an output of diode 222 is coupled to an input of diode 224. Digital-to-analog converter 230 provides an input to variable resistor 238. An output of variable resistor 238 is coupled to an output of diode 246, an output of diode 244, and a first input of operational amplifier 248. An output of switch 232 is coupled to an input of diode 246 and an output of diode 240. Similarly, an output of switch 234 is coupled to a first terminal of capacitor 236. A second terminal of capacitor 236 is coupled to an output of diode 242 and an input of diode 244. An output of diode 240 is coupled to an input of diode 246. Similarly, an output of diode 242 is coupled to an input of diode 244. An output of variable voltage source 252 is coupled to a second input of operational amplifier 248. An output of operational amplifier 248 is coupled to an input of divide circuit 250. An output of divide circuit 250 is coupled to an input of opto-coupler 228. An output of opto-coupler 228 is coupled to modem microprocessor 102. Digital-to-analog converter 254 is coupled to an input of variable voltage source 252.

Figure 5:
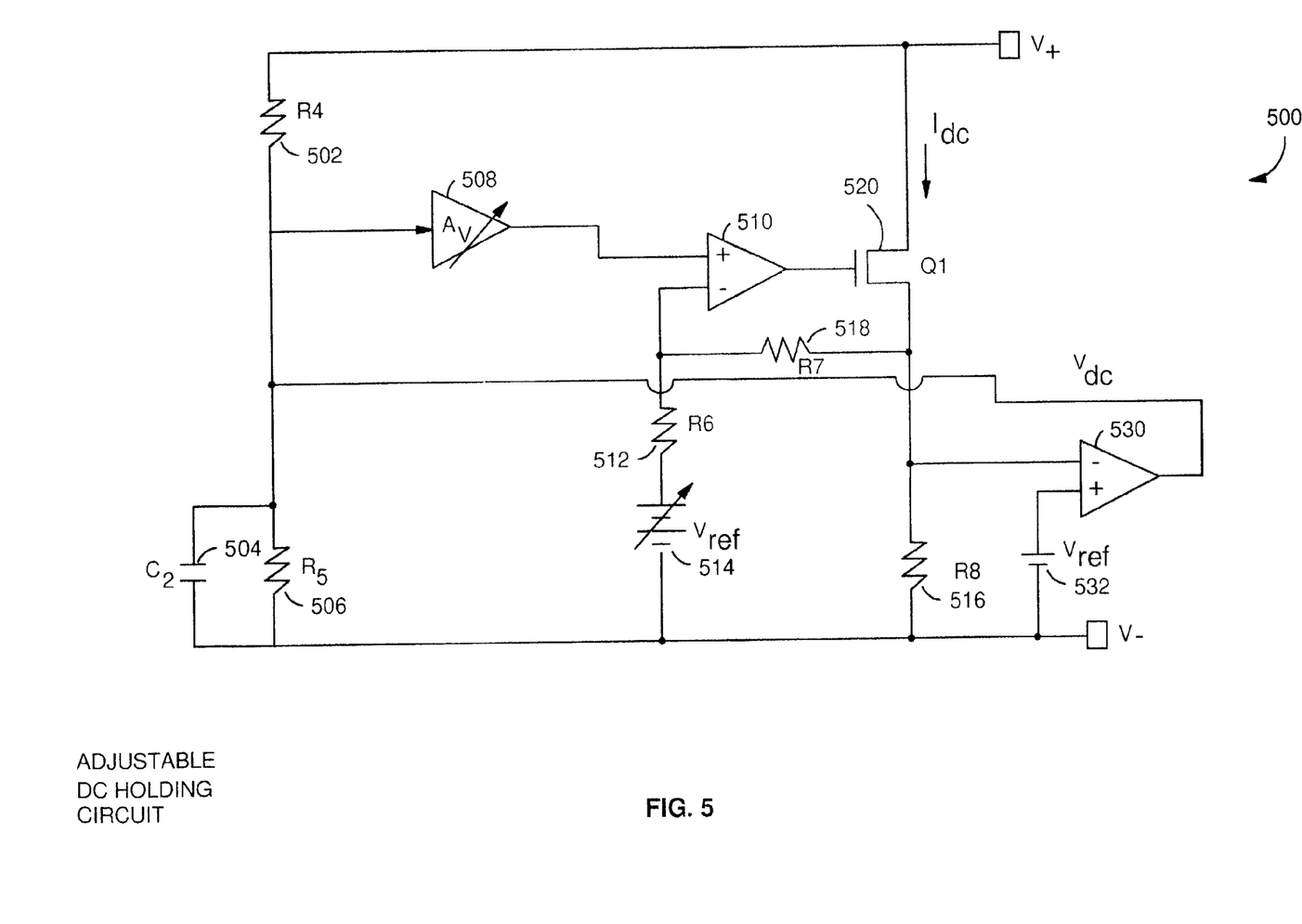
FIG. 5 illustrates, in partial circuit diagram form, one embodiment of an adjustable DC holding circuit in accordance with one embodiment to the present invention.

FIG. 5 illustrates one embodiment of an adjustable DC holding circuit in accordance with one embodiment to the present invention. The adjustable DC holding circuit 500 of FIG. 5 comprises a resistor R4 502, a resistor R5 506, a capacitor C2 504, an amplifier 508, an operational amplifier 510, a resistor R6 512, a variable voltage source 514, a resistor R8 516, a resistor R7 518, a transistor 520, and amplifier 530, and a voltage source 532.

During operation, a voltage value of a $V_{dc}$ is coupled between a V+ and a V− input to adjustable DC holding circuit 500. A first terminal of transistor 520 is coupled to the V+ input. Additionally, a first terminal of resistor R4 502 is coupled to the V+ input. A second terminal of resistor R4 502 is coupled to a first terminal of capacitor C2 504, resistor R5 506, and amplifier 508. An output of amplifier 508 is coupled to a first input of operational amplifier 510. A second terminal of capacitor C2 504 is coupled to a second terminal of resistor R5 506, a first terminal of variable voltage source 514, and a first terminal of resistor R8 516. A second terminal of variable voltage source 514 is coupled to a first terminal of resistor R6 512. A second terminal of resistor R6 512 is coupled to a second input of operational amplifier 510 and a first terminal of resistor R7 518. A second terminal of resistor R7 518 is coupled to a second terminal of resistor R8 516 and a second terminal of transistor 520. An output of operational amplifier 510 is coupled to a third terminal of transistor 520.

In one embodiment of the present invention, amplifier 530 and voltage source 532 may be implemented to provide error amplification. Alternatively, amplifier 530 and voltage source 532 will not be implemented. However, when implemented, a first input of amplifier 530 is coupled to a second terminal of resistor R8 516. A second input of amplifier 530 is coupled to a first terminal of voltage source 532. A second terminal voltage source 532 is coupled to a V− input of adjustable DC holding circuit 500. An output of amplifier 530 is coupled to a first terminal of resistor RS 506.

Figure 6:
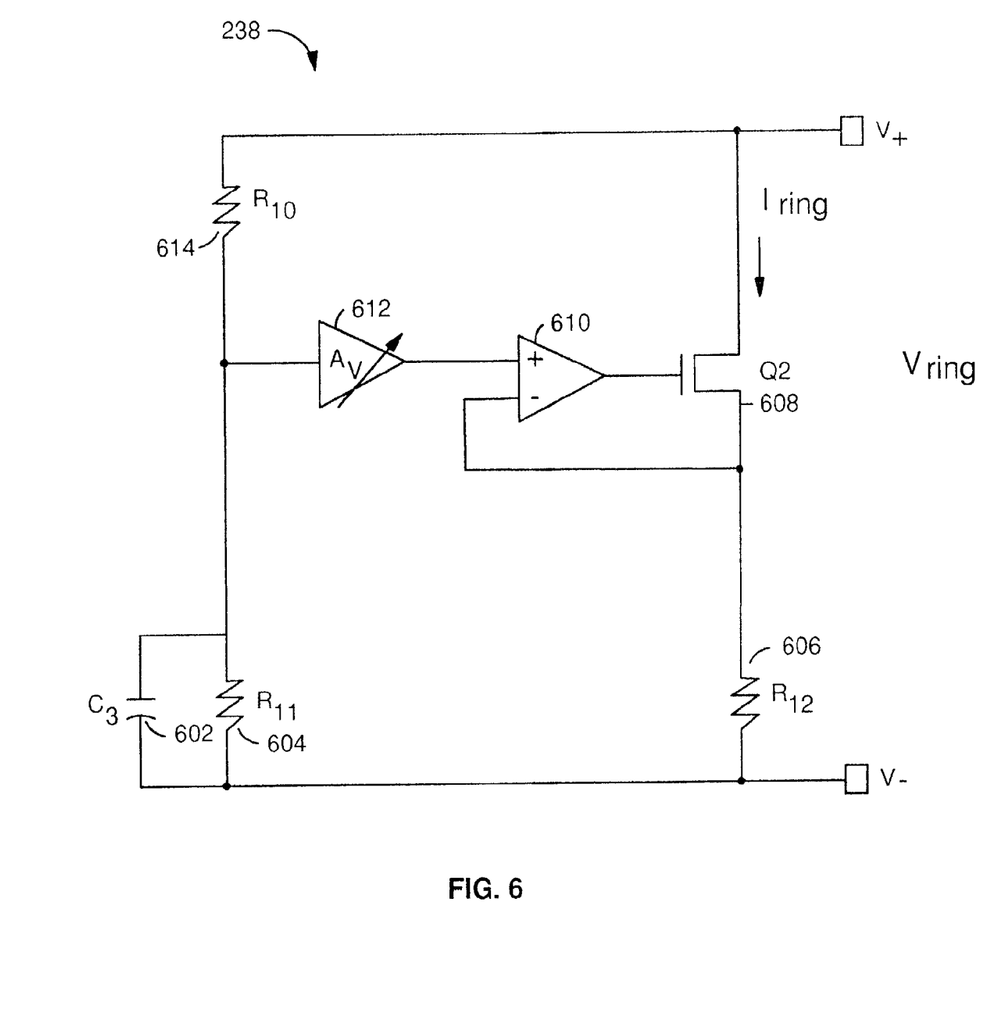
FIG. 6 illustrates, in partial circuit diagram form, one embodiment of an adjustable resistance portion of an adjustable ring detection circuit in accordance with one embodiment to the present invention.

FIG. 6 illustrates one embodiment of a variable resistor portion of adjustable ring detection circuit 238 in accordance with one embodiment to the present invention. This variable resistor portion of adjustable ring detection circuit 600 corresponds to variable resistor 238 of FIG. 2. Adjustable ring detection circuit 600 comprises a capacitor C3 602, a resistor R11 604, a resistor R12 606, a transistor 608, an operational amplifier 610, an amplifier 612, and a resistor R10 614. A V ring voltage value is coupled between a V+ terminal and a V− terminal. The V+ terminal is coupled to a first terminal of transistor 608 and a first terminal of resistor R10 614. The V− input is coupled to a first terminal of resistor R12 606, resistor R11 604, and capacitor C3 602. A second terminal of capacitor C3 602 is coupled to a second terminal of resistor R11 604. The second terminal of transistor R11 604 is also coupled to an input of amplifier 612 and a second terminal of resistor R10 614. An output of amplifier 612 is coupled to a first input of operational amplifier 610. A second terminal of resistor R12 606 is coupled to a second terminal of transistor 608 and a second terminal of operational amplifier 610. An output of operational amplifier 610 is coupled to a third terminal of transistor 608.

Figure 8:
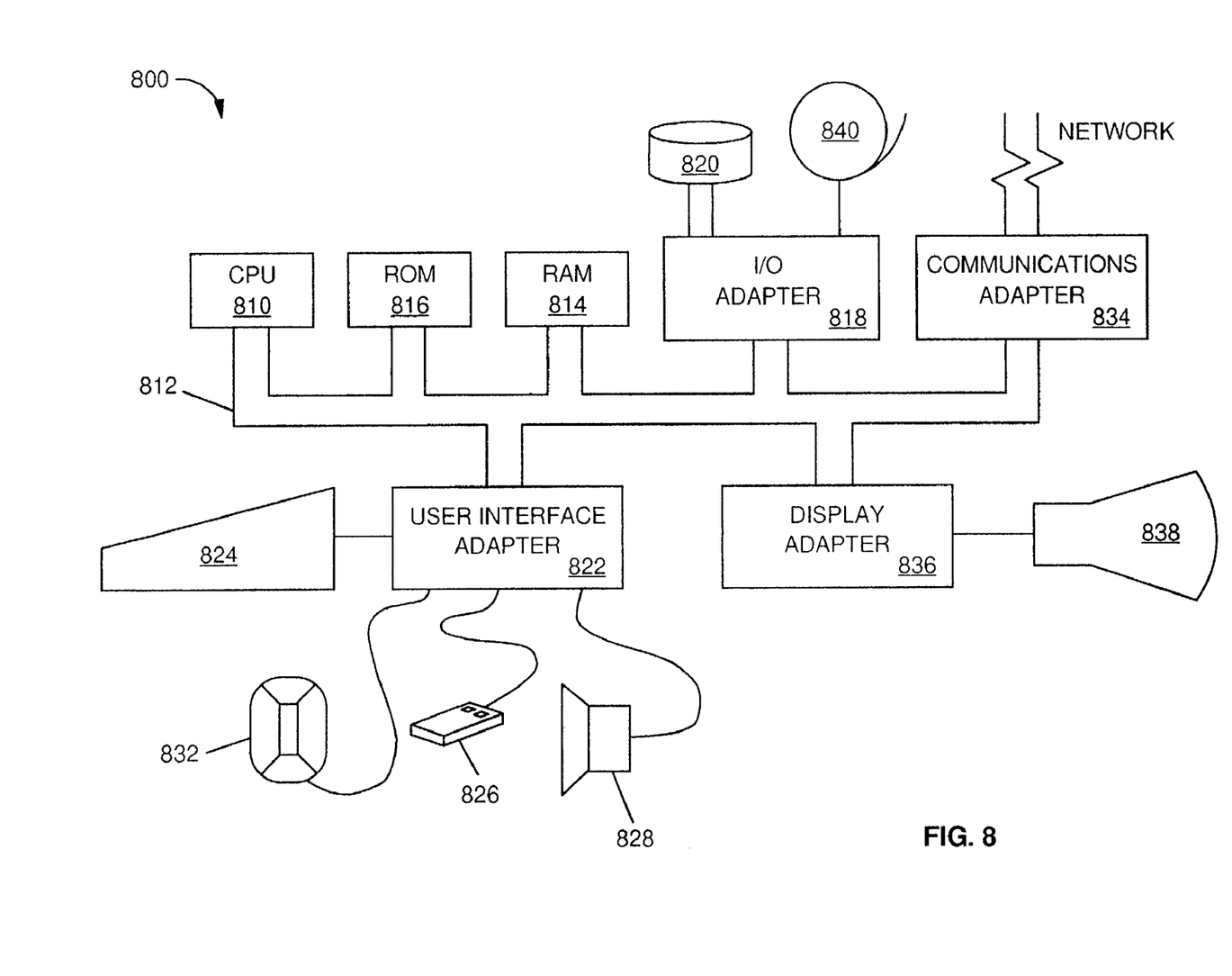
FIG. 8 illustrates, in block diagram form, a data processing system which implements one embodiment to the present invention.

FIG. 8 illustrates an alternate embodiment in which the present invention may be implemented. Referring first to FIG. 8, an example illustrates a data processing system 800 which may be used for implementation of the present invention. The system has a central processing unit (CPU) 810, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 810. The CPU 810 is coupled to various other components by system bus 812. Read only memory ("ROM") 816 is coupled to the system bus 812 and includes a basic input/output system ("BIOS") that controls certain basic functions of the data processing system 800. Random access memory ("RAM") 814, I/O adapter 818, and communications adapter 834 are also coupled to the system bus 812. I/O adapter 818 may be a small computer system interface ("SCSI") adapter that communicates with a disk storage device 820. Communications adapter 834 interconnects bus 812 with an outside network enabling the data processing system to communication with other such systems. Input/Output devices are also connected to system bus 812 via user interface adapter 822 and display adapter 836. Keyboard 824, track ball 832, mouse 826 and speaker 828 are all interconnected to bus 812 via user interface adapter 822. Display monitor 838 is connected to system bus 812 by display adapter 836. In this manner, a user is capable of inputting to the system throughout the keyboard 824, trackball 832 or mouse 826 and receiving output from the system via speaker 828 and display 838. Additionally, an operating system such as AIX ("AIX" is a trademark of the IBM Corporation) is used to coordinate the functions of the various components shown in FIG. 8.

Preferred implementations of the invention include implementations as a computer system programmed to execute the method or methods described herein, and as a computer program product. According to the computer system implementation, sets of instructions for executing the method or methods are resident in the random access memory 814 of one or more computer systems configured generally as described above. Until required by the computer system, the set of instructions may be stored as a computer program product in another computer memory, for example, in disk drive 820 (which may include a removable memory such as an optical disk or floppy disk for eventual use in the disk drive 820). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 9:
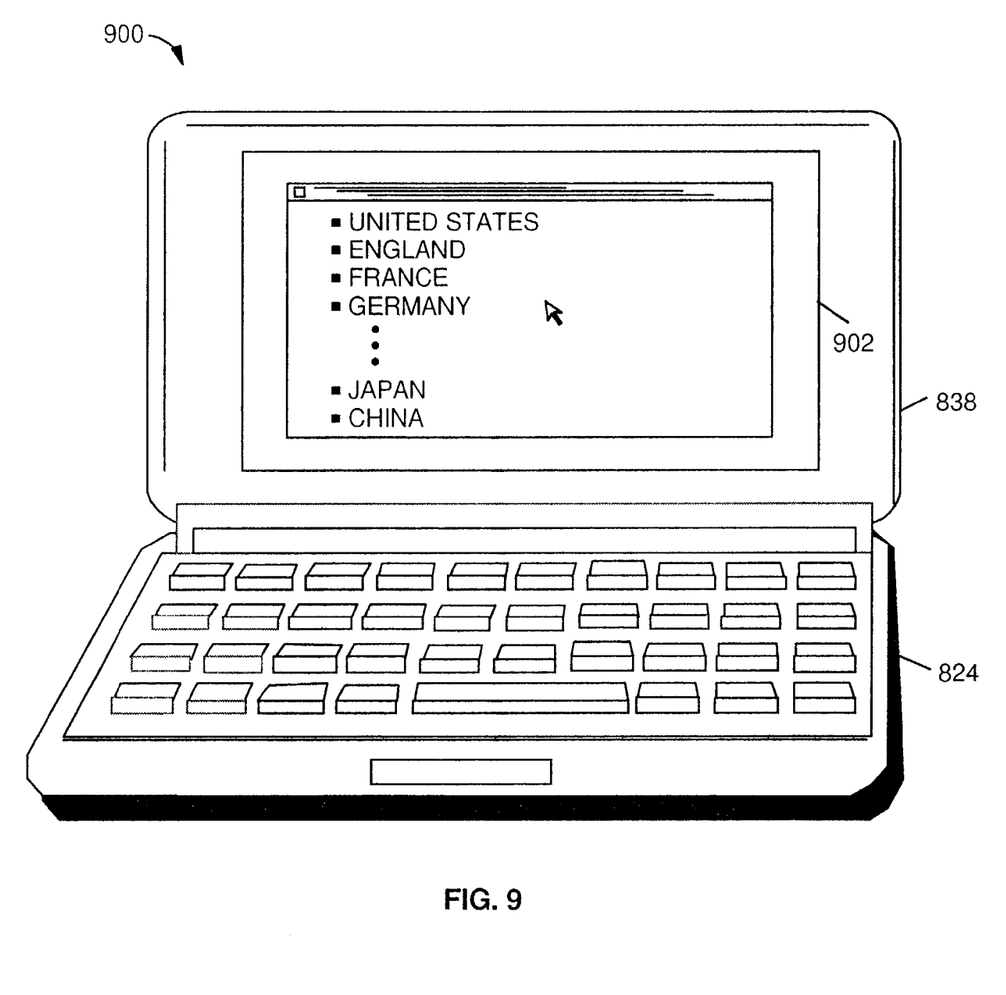
FIG. 9 illustrates, in block diagram form, a user interface implemented in accordance with one embodiment to the present invention.

FIG. 9 illustrates one application in which the present invention may be utilized and a graphical user interface which may be accessed to select modem characteristics in compliance with individual countries. A data processing system 900 of FIG. 9 comprises terminal 838 and keyboard 824, which function in accordance with well-known operating principles of data processing systems, including portable computing applications. Displayed upon terminal 838 is a graphical user interface 902 which allows an external user to select a country to which a modem within data processing system 900 will be connected.

Operation of each of the devices and configurations provided above will subsequently be provided in greater detail.

Description of Operation

Refer now to FIG. 1 for a first embodiment to the present invention. As previously described, the present invention provides a programmable modem/PSTN interface network whose electrical characteristics can be programmed to satisfy the varied, and often unique, telecommunications standards mandated by international countries.

FIG. 1 illustrates one embodiment of a modem which may be utilized to implement the functionality of the present invention. In FIG. 1, DAA 120 is programmably configured via processor 102 and I/O device 116 to have electrical characteristics corresponding to the telecommunications standards promulgated by a country in which modem 100 is utilized. Basically, when a user is at an international destination, the user configures modem 100 to be compatible with that location's telecommunication standards by selecting the desired country from a user interface. The user interface may be reflected by other I/O circuit 108 in one embodiment of the invention.

In the interface formed by other I/O circuit 108, a user interface is provided to allow an external user to select a country corresponding to their desired international destination. After the desired country is selected from the user interface (108), the information is provided to processor 102. Processor 102 uses this information to access country code parameters stored within a table in PROM 104 or RAM 106. One of PROM 104 and RAM 106 provides the appropriate parameters to processor 102. Processor 102 subsequently provides control and data signals to DAA 120 via I/O circuit 116, such that DAA 120 may configure itself to correspond to the telecommunication standards established for the desired international destination.

It should be noted that after DAA 120 has been configured to have parameters associated with a desired international destination, modem 100 functions in a manner typical of most applications. For greater detail concerning operation of modem 100, refer to U.S. Pat. No. 5,239,580 by Bruno, et al. and assigned to International Business Machines Corporation, which is hereby incorporated by reference herein.

To understand operation of the present invention, operation of DAA 120 will subsequently be provided in greater detail. It should be noted that DAA 120 is an electrical interface between a modem and a telephone line. Typically, DAA 120 includes several components. These components include a DC holding circuit which establishes a DC resistance that the telephone line detects when connecting to the modem. Additionally, DAA 120 includes an AC termination network and a ring detect circuit. The AC termination circuit ensures that the modem terminates a connection with a central office via the telephone line within a certain resistance range. For example, in the United States, a modem must terminate a connection to a central office, which is called the local loop, with a resistance of 600 ohms. Additionally, the ring detect circuit must be set to detect a certain amplitude and frequency of a signal transferred via the telephone line to determine when a telephone call is received. Each of the parameters determining the configuration of DAA 120 are stored in a country code table in PROM 104 RAM 106. Thus, when a certain country is accessed via a user interface, these parameters are provided to program DAA 120 to operate in a manner consistent with the telecommunication standards defined for a particular international destination.

Thus, the DC holding circuit is programmed with an off-hook terminal characteristic and the ring detection circuit is programmed with a ring voltage threshold and a ring impedance value. Furthermore, the AC impedance matching network is also programmed through a serial bus interface provided by I/O circuit 116. Programming DAA 120 and the operation of a modem with such a programmed DAA will subsequently be provided in greater detail.

Refer now to FIG. 2, it illustrates DAA 120 in greater detail. In DAA 120, modem microprocessor 102 provides control signals to digital-to-analog converter 212 and digital-to-analog converter 214 to selectively enable a DC holding circuit to be programmed to simulate an off-hook terminal resistance, a parameter utilized by most telecommunication standards. It should be noted that the DC holding circuit of FIG. 2 is comprised of a variable current source 216, variable voltage source 218, and a diode bridge formed from diodes 220 through 226. Before describing operation of the DC holding circuit illustrated in FIG. 2, a brief description of off-hook terminal resistance and its use in a telecommunication standard will be provided herein.

When a modem is connected to a telephone line through a wall connection, the connection is provided to a network referred to as a local loop. In the local loop, the modem may be varied distances from a central office. Therefore, the connection between the modem and the central office has a certain amount of resistance as signals are transferred via a real twisted pair wire that can often run for several kilometers. Depending on a resistance of the local loop, the telephone company utilizes a loop current to determine when the modem is "off-hook" and actually connected to the local loop. A telephone company at another end of the local loop connection detects when the DC current flows and uses that information to determine that a telephone call should be placed.

The magnitude of the current flow will depend on a length of the local loop connection. For example, if the local loop connection is long, the local loop connection will have a great deal of resistance and the current will be much lower than if the modem is connected very close to the central office. Conversely, if the modem is connected very close to the central office, then the local loop connection will have very little resistance and the current will be much higher.

Figure 3:
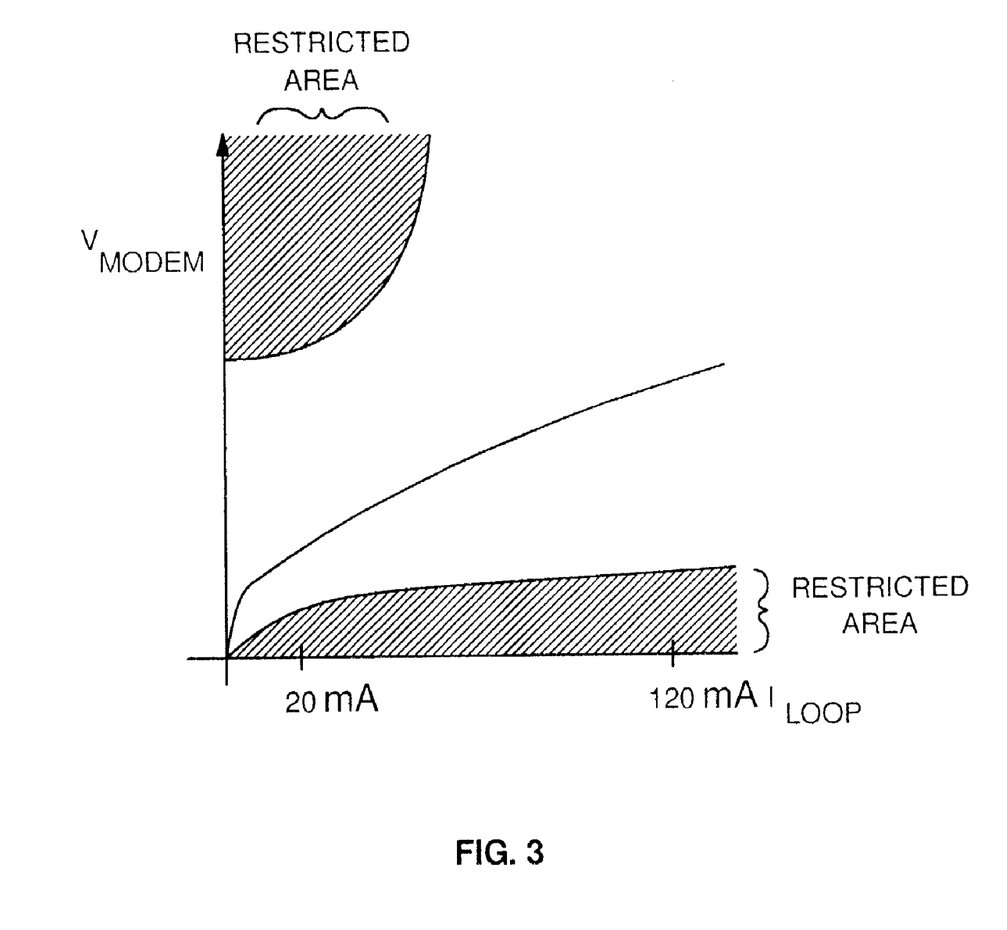
FIG. 3 illustrates, in graphical form, a modem off-hook terminal resistance.

FIG. 3 provides a graphic representation of the voltage and current relationships for a local loop within the United States. Similar graphs may also be made for local loops of international destinations. However, for international destinations, different restricted areas may be required, and often these restricted areas are mutually exclusive.

As may be observed from FIG. 3, a relationship between the voltage and current of a modem connected to a local loop appears to have resistive characteristics. However, as the modem of the present invention is meant to be used in many international countries, a resistor network is impractical to use as it will not provide a proper resistance required for multiple international countries. Therefore, the modem will not operate properly in each international destination. To allow the off-hook terminal resistance for a modem for each country using a same circuit, the present invention provides a circuit which may be programmed to emulate a resistor or resistor network that complies with the characteristics of the off-hook terminal resistance of a country in which the modem is to be used.

In the present invention, this programmability is implemented using modem microprocessor 102, digital-to-analog converter 212, and digital-to-analog converter 214. Modem microprocessor 102 accesses a country code table which includes the DC termination characteristics of a destination country in which the modem is to be operated. Included within these parameters will be a y-intercept value for a resistance, as well as a slope of the resistance, which is to be emulated. This information is then sent to both digital-to-analog converter 212 and digital-to-analog converter 214. This information may be sent via a serial interface controller, such as an I²C, which is a three-wire bus that is very common and typically used in data processing applications.

Through the use of this interface, modem microprocessor 102 provides digital-to-analog converter 212 and digital-to-analog converter 214 with the appropriate information required to configure the DC holding circuit of the present invention to provide the correct resistivity. Specifically, modem microprocessor 102 provides "y-intercept" information to digital-to-analog converter 214 to adjust variable voltage source 218. Additionally, modem microprocessor 102 provides slope information to digital-to-analog converter 212, such that appropriate control is provided to variable current source 216. Each of these values is then used to provide an appropriate equivalent resistance for the terminal output resistance. Therefore, by controlling the y-intercept and the slope which corresponds to an equivalent resistance through the use of digital-to-analog converters 214 and 212, respectively, the present invention provides a DC holding circuit which may be programmably controlled to provide an appropriate off-hook terminal resistance for a modem in any domestic or international application.

Figure 4:
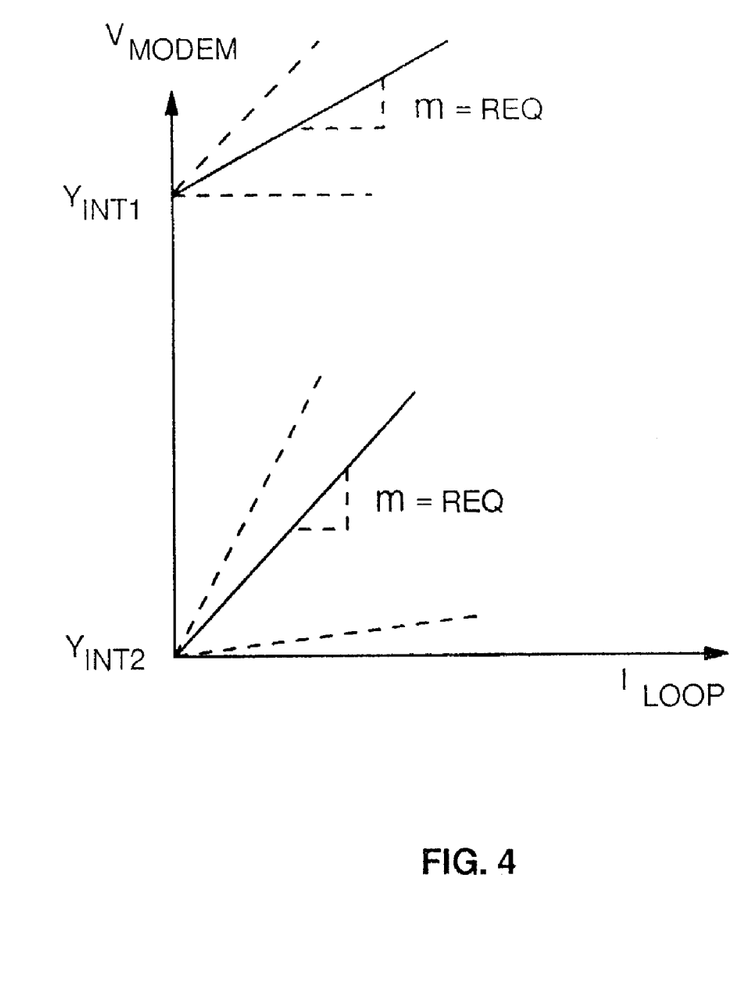
FIG. 4 illustrates, in graphical form, an off-hook terminal resistance for a modem in accordance with one embodiment to the present invention.

For more information regarding the use of digital-to-analog converters 212 and 214, refer now to FIG. 4. FIG. 4 illustrates that by controlling a y-intercept and a slope of a resulting output of a variable voltage source 218 and a variable current source 216, respectively, any off-hook terminal resistance characteristics may be emulated by the DC holding circuit of the present invention. In the DC holding circuit of FIG. 2, variable voltage source 218 and variable current source 216 are coupled between a polarity bridge formed by four diodes, respectively labeled 220 through 226. The polarity bridge formed by diodes 220 through 226 allows the Tip and Ring signals to be reversed. It should be noted that the Tip and Ring signals are actually twisted pair wire connections that may be used to connect devices, such as telephones and modems, to a central office.

FIG. 5 illustrates an alternate embodiment of an adjustable DC holding to circuit 500 in accordance with one embodiment to the present invention. In FIG. 5, an off-hook terminal resistance is determined by a slope of the voltage versus a current characteristic illustrated in FIGS. 3 and 4, and is defined by an equivalent resistance (Req) equation. The Req equation is:

$$Req = \frac{(R8)(R7)(R4+R5)}{(Av)(R6+R7)(R5)} \tag{1}$$

Furthermore, in voltage, VDC, which determines a Y-intercept characteristic of a modem is:

$$Vac = \frac{(R8)(R7)(R4+R5)}{(Av)(R6+R7)(R5)} Idc + \frac{(R6)(R4+R5)}{(Av)(R5)(R6+R7)} Vref \tag{2}$$

Although not illustrated herein, a first digital-to-analog converter controls variable gain amplifier 508 and, thus, is able to adjust a slope characteristic or the terminal resistor provided by the DC holding circuit. Furthermore, a second digital-to-analog converter (not illustrated herein) is provided to control variable voltage source 514. By controlling a variable voltage source 514, operation of operational amplifier 510, and a resistance of resistors 512 and 518, a zero-current voltage intercept, "y-int" may be generated.

This characteristic is defined by the products of $V_{ref}$ and a quantity of resistive terms, including resistor R4 502 through resistor R8 516, as specified in Equation 2. As described above, the ability to control both the y-intercept and the slope of a signal output by adjustable DC holding circuit 500 allows the degrees of freedom necessary to control the voltage-current characteristic of an off-hook terminal resistance for a modem such that the modem is precisely in compliance with the standards required by any country or destination.

Furthermore, for countries requiring local-loop current limiting (i.e., France), an error amplifier may be added to the circuitry of FIG. 5 to monitor a voltage drop across a source resistor R8 516 of transistor 520. This error amplifier is implemented by amplifier 530 and voltage source 532 of FIG. 5. This voltage drop is proportional to the current flowing in the local loop and may then be compared with the reference voltage by the error amplifier (illustrated in FIG. 5). When enabled, the error amplifier's output signal is fed back to the input of a variable gain amplifier 508 and forms a negative feedback loop.

Thus, by implementing such programmable circuitry to emulate resistive circuitry within the modem, the off-hook terminal resistance for a modem may be programmably modified to reflect the characteristics of a country in which the modem is implemented, without requiring that circuitry be replaced or modified using hardware connections.

In addition to an off-hook terminal resistance characteristic, many telecommunication standards require that a modem have certain ring detect characteristics before the modem may be coupled to a local telecommunication system. Typically, ring detect circuits require that a Ring signal have a certain voltage and frequency value. Specifically, in modems, an amplitude for a telephone ring must rise above a certain threshold for the modem to recognize it.

In prior art implementations, the ring detect circuit is a simple circuit which is configured according to the characteristics of a single country in which it will be implemented. In such implementations, the ring detect circuit typically comprises a resistor having a first terminal coupled to a Tip signal and a second terminal coupled to a capacitor. A second terminal of the capacitor is coupled to a first zener diode and an output of the first zener diode is coupled to an output of a second zener diode. An input of the second zener diode is coupled to an opto-coupler, whose output is coupled to the Ring signal. The zener diodes are provided to perform an amplitude sensing function. By performing this function, the zener diodes ensure that the ring voltages rise above a certain value before the ring detect circuit detects any type of signal.

For this reason, the values of the zener diodes may be different for each country, as each country may have a different threshold at which it detects a ring voltage. Additionally, the resistor and capacitor or the prior art implementations must be modified for different countries, as each of these devices establishes an input impedance that the telephone network will view when connected with the modem. As this impedance is different for each country, the impedance must be modified in the ring detect circuit for each country to which the modem is coupled. Lastly, the opto-coupler of the prior art implementation is used to limit a value of a signal provided to the ring circuit. The use of the opto-coupler creates a square wave which is a same frequency as a sine wave input to the ring detect circuit. This square wave is then evaluated to determine whether it is within a certain "window frequency." If the square wave is within a certain window frequency, then the ring detect circuit interprets when a telephone call is being received. Operation of a ring detect circuit is well-known to those with skill in the relevant art, and therefore, will not be described in greater detail herein.

The present invention implements a programmable ring detect circuit which may be programmed to modify the characteristics of a ring detect circuit within a modem to correctly detect when a telephone call is being received in any number of countries. In one embodiment of the present invention, a ring detect circuit is formed by digital-to-analog converter 230, variable resistor 238, a polarity bridge formed by diodes 240 through 246, an operational amplifier 248, a divide-by-two circuit 250, a variable voltage source 252, and a digital-to-analog converter 254.

In the ring detect circuit of FIG. 2, the diode bridge formed by diodes 240 through 246 modifies a sine wave input to the ring detect circuit via the Tip and Ring signals to transpose any negative portions of the sine wave to be positive portions. A resulting signal is a series of positive "bumps" which are provided to a first input of operational amplifier 248. A second input of operational amplifier 248 is provided by variable voltage source 252, which is controlled by digital-to-analog converter 254.

Operational amplifier 248 provides an output signal which limits an amplitude of the signal provided thereto, forming a square wave which has a frequency twice the frequency of the Ring signal. For this reason, the output of operational amplifier 248 is provided to divide-by-two circuit 250, where the frequency is divided in half to have the same frequency as the original Ring signal. Furthermore, opto-coupler 228 is used to ensure that the peaks of the ring voltage do not exceed a certain threshold before they are provided to modem microprocessor 102.

During operation, digital-to-analog converter 230 receives parameter information from modem microprocessor 102 to indicate a resistance for the ring detect circuit of the present invention when in a certain country. The impedance, controlled by variable resistor 238 and capacitor 236, performs the same functions initially performed by the resistor and the capacitor of the prior art implementation. However, the resistor in the present invention is variable and, therefore, may be programmed to comply with the telecommunication standards of a country in which it is being utilized. In our embodiment of the present invention, capacitor 236 is a constant value, and variable resistor 238 is modified to provide for the desired ring detect parameters. In an alternative embodiment of the invention, however, capacitor 236 may be modified to be variable in response to control from a circuit, such as a digital-to-analog converter.

FIG. 6 illustrates an alternative embodiment of a synthesized resistance of adjustable ring detection circuit 600 in accordance with one embodiment of the present invention. In FIG. 6, a resistance of a ring-detect circuit may be modified by adjusting a slope and y-intercept of a graph of a voltage ($I_{ring}$) versus current ($V_{ring}$). By adjusting the gain of amplifier 612, a slope of a resistance formed by element 238 may be modified. This synthesized resistance is then part of the larger ring-detect circuit illustrated in FIG. 2.

Briefly refer to FIG. 2, in FIG. 2, digital-to-analog converter 230 controls the gain of amplifier 612 of FIG. 6. By controlling the gain of this amplifier, digital-to-analog converter 230 effectively. controls the resistance of variable resistor 238. It should be noted that the impedance that the ring-detect circuit of the present invention presents to a fall network is the resistance formed by variable resistor 238 and the reactions of capacitor 236 of FIG. 2. Together, variable resistor 238 and capacitor 236 form an impedance presented to the full network. Furthermore, the diode bridge formed by diodes 240 through 246 rectifies the Ring signal so that a unidirectional, or positive amplitude, signal is formed. Stated another way, the plurality of diodes 240 through 246 rectify the Ring signal. Subsequently, the peaks of the rectified Ring signal are provided to comparator 248. Comparator 248 compares those peaks with a voltage reference formed by voltage source 252. Whenever an amplitude of the Ring signal exceeds a voltage provided by voltage source 252, an output of voltage comparator 248 transitions and a ring operation is effectively detected. However, if the ring voltage is not large enough to be detected, no transition will occur at the output of voltage comparator 248. Therefore, voltage comparator 248 performs a threshold comparison function. Subsequently, an output of voltage comparator 248 is divided by 2 because when a signal is rectified in a manner such as that performed by diodes 240 through 246, a resulting signal has twice the frequency of the original signal. Therefore, the divide-by-two circuit 250 is implemented to divide the output signal to an original frequency.

Figure 7:
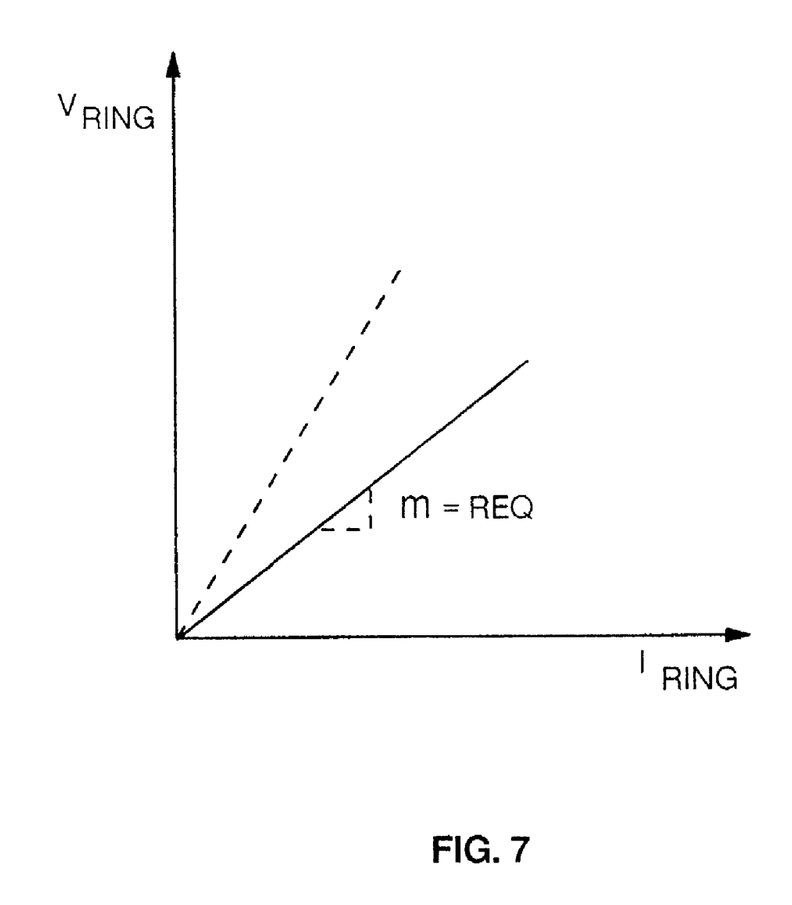
FIG. 7 illustrates, in graphical form, a relationship between a voltage and a current for the resistance component of the adjustable ring detection circuit of FIG. 6.

FIG. 7 illustrates a resulting relationship between a ring voltage and a current which corresponds to a resistive component of the adjustable ring detect circuit illustrated in FIG. 6. The $V_{ring}$ value is:

$$R_{ring} = \frac{(R12)(R10 + R11)}{(R11)(Av)} I_{ring}. \qquad (3)$$

Additionally, the equivalent resistance (Req) provided by the adjustable ring detection circuit of FIG. 6 is:

$$Req = \frac{(R12)(R10 + R11)}{(R11)(Av)} \qquad (4)$$

FIG. 8 illustrates a data processing system 800. Data processing system 800 may be used to implement a modem of the present invention within a data processing application, such as a portable computer. In operation of data processing system 800, CPU 810 enables display adaptor 836 to control information displayed on terminal 838. As part of that control, CPU 810 enables display adaptor 836 to display a graphical user interface on terminal 838 which displays a plurality of countries which may be selected for configuring a modem included within communications adaptor 834. In data processing system 800, the previously referred country code table is stored in one of ROM 816 and RAM 814. Operation of the present invention is performed in compliance with the steps previously outlined.

FIG. 9 illustrates a portable data processing system 900 which includes a graphical user interface 902, as illustrated on a display device, such as device 838.

While there have been provided herein several embodiments of the present invention, it should be noted that additional configurations may also be implemented. For example, . . .

Furthermore, there have been described herein the principles of the invention, it is to be clearly understood to those skilled in the art that this description is made only by way of example and not as a limitation to the scope of the invention. Accordingly, it is intended, by the appended claims, to cover all modifications of the inventions which fall within the true spirit and scope of the invention.

What is claimed is:

1. A system comprising:
    a modem microprocessor responsive to predetermined signals to access a country code table, extracting information relating to the predetermined signals and using said information to generate configuration signals representative of a country telecommunication standard;
    a ring detect circuit operatively coupled to said microprocessor, said ring detect circuit including a first digital-to-analog converter, responsive to the configuration signal, operatively coupled to the microprocessor;
    a second digital-to-analog converter, responsive to the configuration signal, operatively coupled to the microprocessor;
    a first rectifying circuit;
    a capacitor operatively coupling the rectifying circuit to a first terminal;
    a conductor operatively coupling the rectifying circuit to a second terminal;
    a variable resistor operatively coupled to the rectifying circuit and the first digital-to-analog converter;
    a variable voltage source operatively coupled to the rectifying circuit and the second digital-to-analog converter;
    an operational amplifier connected to the rectifying circuit, the variable resistor and the variable voltage source; and
    a feedback loop interconnecting the operational amplifier to the modem microprocessor.

2. The system of claim 1 wherein the feedback loop includes a divide by two circuit connected in series with an opto-coupler.

3. The system of claim 1 wherein the first rectifying circuit includes a diode bridge.

4. The system of claim 1 further including
    a holding circuit operatively coupled to the modem microprocessor; said holding circuit including a third digital-to-analog converter operatively coupled to the modem microprocessor;
    a fourth digital-to-analog converter operatively coupled to the modem microprocessor;
    a second rectifying circuit;
    a conductor operatively coupling the second rectifying circuit to the first terminal;
    a conductor operatively coupling the second rectifying circuit to the second terminal;
    a variable current source operatively coupled to the third digital-to-analog converter and the second rectifying circuit;
    a second variable voltage source connected in series with the variable current source and operatively coupled to the fourth digital to analog converter and the second rectifying circuit.

5. The system of claim 4 wherein the second rectifying circuit includes a diode bridge.

6. The system of claim 5 further including a first switch operatively coupling the diode bridge and the second terminal.

7. The system of claim 6 further including a second switch operatively coupling the diode bridge to the first terminal.

8. The system of claim 7 having a transformer with one winding operatively connected to the first switch and the second switch;
- a pair of analog switches connected in parallel to another winding of the transformer; and
- a data pump operatively coupled to the analog switches, the another winding and the microprocessor.

9. The system of claim 1 further including a computer with a graphical user interface displaying at least one country and if said one country is selected by a pointer said computer generating and forwarding the predetermined signals to said modem processor.

10. The system of claim 9 wherein the computer includes a portable personal computer.

* * * * *